Patented Dec. 3, 1940

2,224,059

UNITED STATES PATENT OFFICE 2,224,059

FRUIT VINEGAR

Hans Mostny, Godoy Cruz, F. C. P. Mendoza, Argentina

No Drawing. Application May 20, 1937, Serial No. 143,851. In Austria June 20, 1936

3 Claims. (Cl. 99—147)

This invention relates to a method of manufacturing fruit vinegar from fruits of all kinds for example apples, pears, cherries, plums, peaches, apricots, green-gages, bullaces (damsons), if desired oranges and figs, as also berries of all kinds, for example grapes, particularly grapes poor in sugar, gooseberries, currants, raspberries, whortleberries, blackberries, mulberries, strawberries, mountain ash berries (rowan-berries), elderberries, and the like.

It is already known to utilize fruit and berry wine for the production of fruit vinegar. Since the alcohol content of natural fruit wines depends upon the sugar content of the fruits from which the wines are made, in the manufacturing of fruit vinegar by the alcoholic fermentation of fruit juices, fruit extracts, or fruit mashes, with subsequent oxidation of the alcohol to acetic acid the sugar content of the fruit used determines the acetic acid concentration obtainable.

The sugar content of the various kinds of fruit which come into consideration for the preparation of fruit vinegar fluctuates. The average sugar content, expressed in percentages, amounts according to a statement found in a publication for example in the case of apples to 7.2, pears 8.2, cherries 10.2, and in the case of many other fruits, more particularly berries, to very considerably less still. The alcohol concentration of the fruit wine used for the production of fruit vinegar, and consequently the concentration of acetic acid in the fruit vinegar produced, thus has a natural limit set to it, unless supplementary sugar (foreign sugar that is sugar not occurring in fruits, such as beet sugar, cane sugar or starch sugar), be added to the fruit juices, fruit extracts, or fruit mashes before fermentation. However, this artificial supplementing of the sugar content (in some localities) is only permitted within certain limits if at all. But it will in any case be clear that the adding of sugar to fruit juices, fruit extracts, or fruit mashes represents merely an emergency expedient. Insofar as it is allowed at all, this expedient is only made use of because the fermenting of raw juices poor in sugar is attended with difficulties, more particularly owing to the ready occurrence of secondary and false fermentations. The working up of alcoholic liquids of low alcohol concentration also gives rise to particular difficulties in connection with the fermentative acetification. The addition of foreign sugar to the juices, extracts, or mashes makes it possible, it is true, to obtain liquids richer in alcohol, but at the same time this expedient robs the resulting products of the character of a natural product, quite apart from the fact that it is not possible in this manner to increase the alcohol content of the fruit wines and the acetic acid content of the fruit vinegars to an unlimited extent for the reason that legal limits are set to the extent to which foreign sugar may be added.

The present invention has for its object to obtain fruit vinegars of high content of acetic acid, with the complete avoidance of the addition of foreign sugar or at least with very considerable reduction in the amount of such addition.

Another object of the invention is to obtain fruit vinegars of an excellent aromatic character and taste.

A further object of the invention is to avoid difficulties existing hitherto in the production of fruit vinegar.

Further objects of the invention will appear as the description proceeds.

The present invention consists essentially in the production of fruit vinegar by subjecting to acetic fermentation, alcoholic liquids obtained from juices pressed out from fruits, fruit extracts, or fruit mashes and having an alcohol content derived from natural fruit sugar and higher than that corresponding to the natural fruit sugar content of the raw juices obtainable from the fruits started with in the particular case. The high alcohol content of the liquids which are to be converted into vinegar, may be obtained in different ways. One of these ways consists substantially in increasing the content of natural fruit sugar in the starting material by reducing the water content of the starting material or by introducing natural fruit sugar from another source, and then subjecting the material of an increased content of natural sugar to alcoholic fermentation and thereafter subjecting the product thus obtained to acetic fermentation. Another way is to subject the juices pressed out from fruits, or fruit extracts, or fruit mashes to alcoholic fermentation, to remove part of the water percentage content so as to increase the content of alcohol derived from natural fruit sugar in the alcoholic liquid and thereafter to subject the liquid of a high alcohol content to acetic fermentation.

According to the present invention for instance apple juice of a natural fruit sugar content of 8% by weight may be enriched up to a content of fruit sugar of 14% giving after alcoholic fermentation an alcohol content of about 7% by volume; by acetic fermentation of the said alcoholic liquid an acetic acid concentration of the fruit vinegar is obtained of about 6 g. acetic acid in 100 cm.$^3$ of liquid (i. e. about 6%).

As another example there may be mentioned that starting from particular sweet pears of a high content of natural fruit sugar from which raw juices may be obtained of a content of natural fruit sugar of about 12% a fruit juice enriched with natural sugar up to 24% may be obtained; such fruit juices give after alcoholic fermentation a fruit wine of say 12% alcohol content; the fruit vinegar obtained from this alcoholic liquid by acetic fermentation may contain about 10.5 g. acetic acid in 100 cm.³ liquid (i. e. about 10.5%). The enrichment in natural sugar is, of course, controllable between wide limits. The same applies to the augmentation of the alcohol content of the fermented alcoholic liquids by removing a portion of the water therefrom.

For the purpose of increasing the content of natural sugar of the juices pressed out from fruit, fruit mashes, or fruit extracts (the latter obtained for example by the diffusion method or by the extracting method) there are used for example the known methods of concentrating liquids gently. When the concentration is effected before fermentation the juices, mashes, or extracts may be concentrated for instance by cautious evaporation, preferably in a vacuum, or by spraying into the air, and the like. A further method of concentrating juices of this description consists in freezing out part of the water. A freezing process of this type, which has the advantage that colloidal substances and more particularly nitrogen compounds are also eliminated by the cold, may be carried out before the pressing of the fruits, or alternatively the non-fermented juices, extracts, or mashes may be concentrated by the freezing out of water.

For enriching the natural fruit sugar content in the juices pressed out from fruit, or fruit extracts or fruit mashes there may further also be incorporated additions rich in natural sugar, say in the form of thickened (highly concentrated) juices or the like or in the form of dried fruits rich in natural sugar. The concentrates obtained which are enriched with natural sugar are subsequently subjected to alcoholic fermentation whereby alcoholic liquids with an increased alcohol content are obtained which are then subjected to acetic fermentation.

According to another mode of operation the juices, extracts, or mashes are subjected to fermentation without having been preliminarily concentrated, but the alcohol content of the already fermented material is increased by reducing the water content, e. g. by freezing out a part of the water content, and thereafter acetic fermentation is carried out.

According to a particular embodiment of the invention dried fruits, for example dried pears, apples, plums, figs, or the like are used instead of fresh fruits as raw material, and fruit extracts or fruit mashes prepared therefrom which have an increased natural sugar contact as compared with the fresh pressed juices obtained from these fruits. Apart from the employment of the methods enumerated above it is also possible to obtain directly such fruit extracts or fruit mashes with increased sugar content, by mashing (or macerating) the dried fruits with suitably restricted quantities of liquid, for example water or pressed juices.

Fruit extracts obtained by diffusion or extraction from the dried fruits may likewise be directly obtained with a sugar concentration which is very considerably increased as compared with that of the raw juices, and first subjected to alcoholic fermentation and thereafter to acetic fermentation. All the methods mentioned above may be used in combination.

The fruit wines, fermented fruit mashes, or fermented fruit extracts obtained, as intermediate products, in this or any other manner, within the scope of the present method, have a high alcohol contact, higher than corresponds to the natural sugar content of the raw pressed juices, without the necessity for having recourse to an addition of foreign sugar at all or in any appreciable quantity, to achieve this result.

Under certain circumstances it may be advisable to concentrate the raw juices as they come from the press, or the mashes or but slightly concentrated extracts, in a manner known per se, by evaporation or the like to such an extent that the resulting enrichment in fruit sugar is sufficient for preserving the material, so that no further preservatives need be added. The products thus preserved in their own fruit sugar may then be adjusted, in the course of further working up, by the addition of water or juices poor in sugar to a desired fruit sugar content which is higher than that of the original raw juices, so that the subsequent fermentation may yield fruit wines the alcohol content of which is increased within wide limits.

Irrespective of whether the raw juices, mashes, and extracts be concentrated to a degree suitable for immediate fermentation, or further thickened to a point at which they may be preserved in their own fruit sugar and then subsequently diluted again to the required sugar content in preparation for fermentation, the advantage is in any case achieved that the fermentation can be carried out with smaller bulk of fermentable matter than in the case of the method of working hitherto adopted, which not only implies a saving in fermenting space and apparatus but also enables the fermentation to be more accurately controlled. There may also be employed for example juices sterilized by appropriate rigorous filtration. For the alcoholic fermentation it is preferable to use strong pure culture yeasts of great fermenting power, for example *Saccharomyces ellipsoideus* (Stamm Südwein) or *Saccharomyces ellipsoideus* (Stamm Wolporzheim) or *Schizosaccharomyces mellacei* Jörgensen or others.

By mixing together different concentrates of one and the same type of fruit or of different kinds of fruit, for example apples and pears, uniform products are obtained, more particularly when unfermented concentrates are mixed together or the concentrates brought together during fermentation, and that with less expenditure of energy, reduced requirement in the matter of space, and greater certainty, than hitherto, which fact is of great value from the point of view of standardization. A particularly advantageous form of the invention has been found to be a method of working in which a known quantity of a juice of normal or but slightly increased sugar content is set in fermentation, after which a concentrate of suitably high sugar content is allowed to run into the fermenting liquid. The proportioning of the amounts of the thin juice and thick juice thus mixed together during fermentation, that is to say the sugar content of these liquids, is so adjusted that the finished fermented mixture has a substantially increased alcohol content. This mode of conducting the fermentation facilitates very considerably the fermenting of the concentrates. It is also possible, within the scope of the present method, to subject fruit wines of low alcohol concentration, which may if desired be sterilized, to refermentation in a manner known per se, an increase of the sugar content and consequently of the resulting alcohol content being, however, brought about, according to the invention, by the addition of a concentrate. In both cases it is, of course, possible to effect the increasing of the fruit sugar concentration by adding the concentrate in a semi-liquid to solid condition.

The fruit wines, fermented mashes or fermented extracts destined to be further worked up into fruit vinegar represent, in the extreme case, absolutely natural products. If, in spite of the increased natural sugar concentration, foreign sugar is added, within the legally prescribed limits, during the production of the fruit wines, at all events very considerably smaller amounts of foreign sugar will be consumed for the attainment of the same alcohol content than heretofore, or a far higher alcohol content obtained in the fruit wines, fermented extracts or fermented mashes with the same quantity of added foreign sugar, so that after the acetic acid fermentation fruit vinegars of high acetic acid concentration are obtained. The oxidation of the alcohol in the fermented liquids may be effected by any of the known methods, and more particularly by the quick vinegar process.

The fermentative oxidation of fruit wines of higher alcohol content does away with the danger of infection, particularly of infection with slime bacteria which readily develop in fermenting materials containing but little alcohol and acetic acid. The method according to the invention also allows of the attainment of higher yields of acetic acid, based upon the alcohol content of the alcoholic liquid subjected to the acetic fermentation. Moreover, in consequence of the more abundant esterification, vinegars of a particularly aromatic character are obtained by the method according to the invention. Further advantages of this method are reduced requirement in the matter of space, a saving in casks, and diminished running expenses and overhead charges.

*Example*

12,000 litres of pear juice, centrifuged and filtered, as pure as possible, having a sugar content of 12%, is evaporated in vacuo at 35–40° C. until the natural sugar content has risen to 24%. There is obtained approximately 6000 litres of thick juice which is then intimately mixed with 1200 grammes of ammonium chloride and 100 litres of vigorously fermenting seed yeast (e. g. pure culture Gumpoldskirchen yeast), the mixing being preferably effected with the aid of a sterile circulating pump. The vigorous fermentation setting in soon after mixing is concluded, according to the manner in which the fermentation is conducted, in 2 to 3 weeks, and this is then followed by the after-fermentation which is finished, according to the circumstances of the case, in at the most 2 to 3 months. The fruit wine thus obtained has an alcohol content of 11.8%. After termination of fermentation the liquid is carefully drawn-off from the deposit, improved in appearance, filtered absolutely clear, and preferably left to stand for 3 months to allow colloidally dissolved substances to settle, after which the liquid may if desired be once more filtered, and is then converted into vinegar in a known manner in a quick process acetifier, a concentration of about 10% acetic acid and 0.4% residual alcohol being obtained. The fruit vinegar obtained is an absolutely natural product of a very fine taste and aromatic character partly due to the abundant esterification.

In the following claims I use the term "fruit juice" to include, besides juices obtained from fruits by pressing them out, also extracts and mashes both obtained from fruits no matter whether the fruits used as raw material are fresh or in a partially or completely dried state, however, with the exception of juices obtained from evaporated skins and cores or evaporated chopped fruits by leaching or soaking them with water alone.

Moreover, in the following claims I use the term "natural fruit sugar" to designate sugar contained in edible, more or less succulent, products of perennial or woody plants, consisting of the ripened seeds and adjacent or surrounding tissues, or of the latter alone. In contradistinction thereto the expression "foreign sugar" used in the foregoing description means sugar not contained in fruits but produced according to well known technical processes from beets, cane, or starchy materials, such as potatoes.

Furthermore, I use in the following claims the term "fruits derived from the class of Rosiflorae" in the sense of the "Lehrbuch der Botanik" by Professor Strasburger, 13th edition, published by G. Fischer, Jena, 1917, to include the group of fruits comprising inter alia *Ribes rubrum, nigrum,* Grossularia, *Pirus malus, Pirus communis, Cydonia vulgaris, sorbus Aucuparia,* Fragaria, Rubus, *Rubus idaeus, Prunus cerasus, Prunus avum, Prunus domestica, Prunus armenica, Prunus persica*. The common English names of these fruits are respectively: red currant, black currant, gooseberry, apple, pear, quince, quick bean, strawberry, bramble, raspberry, common cherry, sweet cherry, plum, apricot, peach.

I claim:

1. In the manufacture of fruit vinegar the steps of producing a fruit juice from edible fruits derived from the class of Rosiflorae, concentrating said juice by removal of water therefrom to such extent that the natural sugar contained therein is enriched up to a minimum amount of 14 per cent by weight of fermentable sugar, and subjecting said enriched juice to alcoholic fermentation, and thereafter subjecting the obtained alcoholic liquid to acetic fermentation.

2. In the manufacture of fruit vinegar the herein described improvement comprising preparing from fruits a fermented fruit juice having an alcohol content derived from natural fruit sugar higher than that corresponding to the amount of natural fruit sugar contained in juice pressed out from the said fruits, the said alcohol content amounting at least to 7 per cent by volume of alcohol, and subjecting the alcoholic liquid so obtained to acetic fermentation.

3. The herein described process of producing fruit vinegar which comprises preparing a fruit juice from a fruit containing natural sugar, subjecting said juice to alcoholic fermentation, and subjecting the fermented juice to acetic fermentation, and at some stage of said process prior to the beginning of the acetic fermentation, subjecting the liquid to sufficient concentration by the removal of water therefrom, to produce at the commencement of the acetic fermentation, a fermented liquid containing at least about 7% alcohol.

HANS MOSTNY.